United States Patent [19]

Martin

[11] Patent Number: 5,893,695
[45] Date of Patent: Apr. 13, 1999

[54] STAPLE REMOVEABLE BY HAND

[76] Inventor: Otis Steven Martin, 11339 SSG Sims St., El Paso, Tex. 79908

[21] Appl. No.: 08/848,925

[22] Filed: May 1, 1997

[51] Int. Cl.⁶ .................... F16B 15/00; F16B 15/02
[52] U.S. Cl. .................. 411/457; 411/473; 411/920
[58] Field of Search .................... 411/442, 469, 411/473, 474, 920, 457; 156/DIG. 22

[56] References Cited

U.S. PATENT DOCUMENTS

| | | | |
|---|---|---|---|
| 960,206 | 5/1910 | Silverstein | 156/DIG. 22 |
| 1,623,335 | 4/1927 | De Bonis | 411/469 |
| 2,072,125 | 3/1937 | Novick | 411/920 X |
| 2,383,135 | 8/1945 | Lang | 411/920 X |
| 2,778,019 | 1/1957 | Weimont | 156/DIG. 22 |
| 2,912,697 | 11/1959 | Westbrook | 156/DIG. 22 |
| 4,129,059 | 12/1978 | Van Eck . | |

FOREIGN PATENT DOCUMENTS 797766  7/1958  United Kingdom ............ 411/442

*Primary Examiner*—Neill Wilson

[57] ABSTRACT

The invention pertains to an improvement upon staples, of the type used for fastening papers together and other materials together, whereby the crown of the staple is replaced with a rigid material extending beyond both staple prongs, allowing the staple to be removed by manually lifting up on the rigid material.

4 Claims, 1 Drawing Sheet

1

STAPLE REMOVEABLE BY HAND

BACKGROUND OF THE INVENTION

1. Field of the Invention

The present invention relates to staples, and in particular, of the type used to fasten paper together and to fasten other materials together.

2. Description of Prior Related Art

In offices, schools, factories and homes there is a need to securely fasten and unfasten paper together in an inexpensive and quick manner. There is also a need for a fastener that is asthetically pleasing and can provide identification as to the origin of the documents.

Staples securely fasten paper together but have a drawback in that they are not easily removed by hand without the aid of a mechanical device. Furthermore the documents are fastened together with an unfinished appearance. Papers stapled with conventional staples only have a thin wire crown holding the face of the documents together and frequently come apart by the staple pulling through the first few sheets. Conventional staples also do not provide for any method to identify the entity from which the documents originate.

Paperclips are easily removed but have a drawback in that the papers are not securely fastened together. Paperclips also do not provide for any method to identify the entity from which the documents originate.

Spring loaded clips, commonly called binder clips, with handles are available for fastening papers, and the papers are securely, fastened, however the clips are relatively expensive and are bulky. Furthermore these type of fasteners do not present neither a finished appearance nor allow the papers to lie flat in a stack. These type of devices are also installed by hand, thus storage of the fasteners is not in a machine, such as a stapler, as the present invention is stapled with and stored in.

Other fastening devices that are available require that holes first be punched into the papers to be attached, wire fasteners be threaded through the holes and metal tabs be bent on the backside of the papers. These devices, commonly called paper fasteners, are relatively expensive, cumbersome, and slow compared with the present invention. Additionally these devices must be installed by hand, instead of with a machine, a stapler, with which the present invention is stapled with and stored in. When the fastening devices are removed, the papers are left with holes that are approximately ¼" in diameter. These type of fasteners also do not present a finished appearance.

No device is known for fastening documents together in an expeditious, inexpensive and asthetically pleasing manner and be able to be unfastened by hand without the aid of a mechanical device. Furthermore no device is known whose holding power is greater than that of a conventional staple and yet still be able to be stapled by and stored in a mechanical device, a stapler, and will also provide a method to identify the entity from which documents originate.

SUMMARY OF THE INVENTION

The principal object of the present invention is an improvement on the staple in that the invention can be easily removed by hand without a mechanical device, as can be a paperclip, yet provides more holding power than that of a conventional staple.

It is also an object of the present invention to provide space for a company logo or other identifying design as well as a more finished appearance than that of either conventional staples, paperclips, binder clips, paper fasteners and other spring type fasteners.

The foregoing objects can be accomplished by replacing the thin staple crown with a wider rigid material to the staple prongs such that when the present invention is stapled to paper, such rigid material would be parallel relative to the paper extending past a staple prong on one end, subsequently referred to as the "lifting" end, in sufficient length to allow a digit of one's hand to get between the paper and the rigid material.

A length of the rigid material extends over the opposite staple prong, hereafter referred to as the "fuilcrum end", to provide leverage sufficient to allow the present invention to be separated from the paper without the aid of a mechanical device, by a person lifting up on the "lifting" end, so that the rigid material is placed from a parallel to a non-parallel position relative to the paper.

A sufficient length of the rigid material on the "fulcrum" end extends past the staple prong near the same end, to allow for the complete separation of the same staple prong when the "lining," end is pulled up to where the rigid material is placed into a non-parallel position relative to the paper.

The present invention is also directed to staple prongs attached to a rigid material, such rigid material having a surface on its face large enough so that a design can be affixed to it and be seen.

DESCRIPTION OF THE PREFERRED EMBODIMENT

Figure 1:
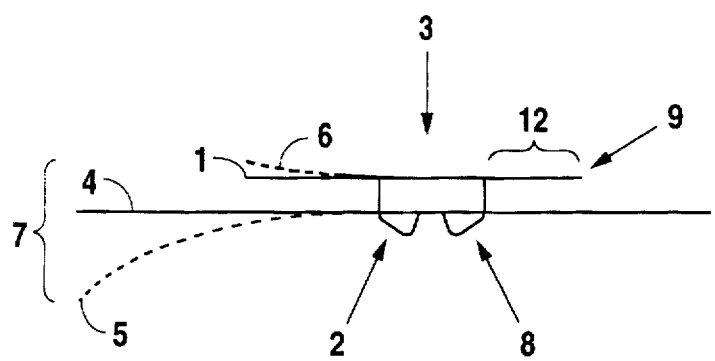
FIG. 1 is an enlarged side view of the present invention stapled into paper.

Refer now to FIG. 1, which is an enlarged side view of a preferred embodiment of the invention, an improved staple, as stapled into paper. The lifting end 1, in this example on the left, of the rigid material 3 extends past the staple prong 2 a sufficient length to allow one to place one's digit of one's hand between the lifting end 1 of the rigid material 3 and the paper 4, as the paper 4 is bent down 5 and the rigid material 3 is slightly bent up 6 creating a space 7.

The length 12 of the rigid material 3 exceeds the length of the staple prong 8 closest to the fulcrum end 9, in order to allow for complete extrication of both staple prongs when the rigid material 3 is lifted into a non-parallel position relative to the paper.

The overall length of the rigid material 3 is sufficient to produce adequate leverage for one to lift up on the lining end 1, unaided by a mechanical device, using the opposite end 9 of the rigid material 3 as a fulcrum point, and extricate staple prongs 2 and 8.

Figure 2:
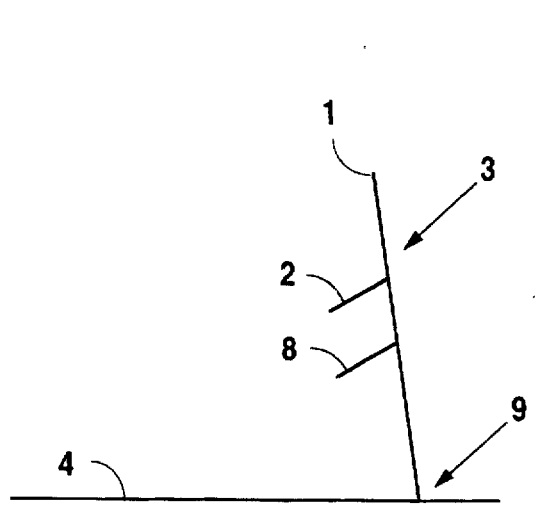
FIG. 2 is an enlarged sideview of the present invention shown after the staple prongs have been extricated from the paper.

Refer now to FIG. 2 which is an enlarged side view of the preferred embodiment of the invention as separated from paper 4 after having been stapled through it. The rigid material 3 is in a non-parallel position relative to the paper 4, with staple prongs 2 and 8 extricated from the paper 4. The lifting edge 1 of the rigid material is pulled away from the paper 4, using the opposite end 9 of the rigid material 3 as a fulcrum.

Figure 3:
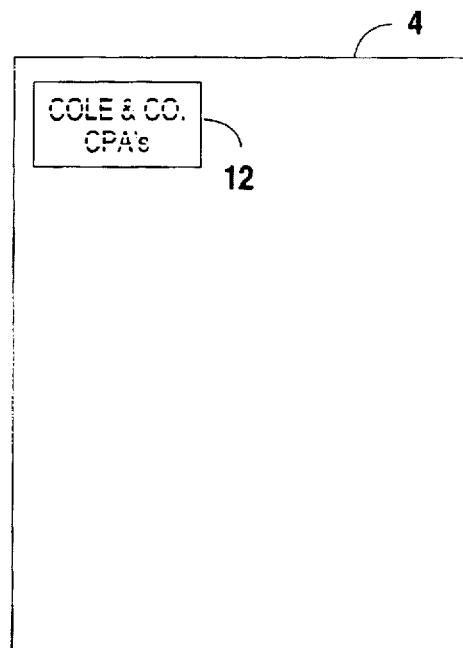
FIG. 3 a top view of the present invention shown with an example of a design on its face.

Refer now to FIG. 3 which is a top view of the preferred embodiment of the invention stapled into paper 4. The face 12 of the rigid material is of sufficient size to display an asthetically pleasing appearance, shown here as a sample company logo.

Figure 4:
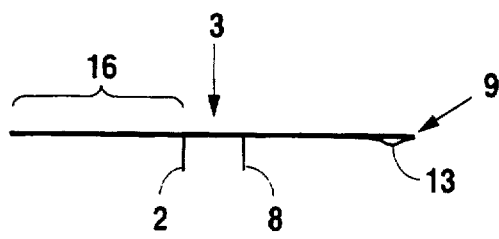
FIG. 4 a side view of the present invention with a bump under the rigid material on the fulcrum end attached to accentuate leverage.
Figure 5:
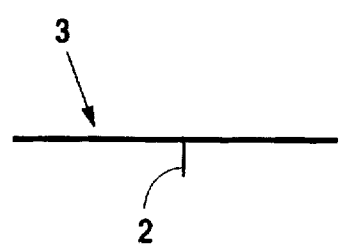
FIG. 5 is a side view of the present invention which shows the rigid material head and a single prong.

Refer now to FIG. 4 which is a side view of an alternative embodiment of the invention with a bump 13 on the underneath side of the rigid material 3. Such bump accentuates the fulcrum effect without increasing the length of the face of the rigid material 3. The face area of the rigid material 3 also provides more surface area on the face of the papers with which to bind papers together than do conventional staples. The area 16 serves as a lip with which to grasp and pull up the rigid material 3 onto the bump 13 to extricate prongs 2 and 8.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A fastener of the type to fasten paper of which the improvement comprises a head attached to prongs in such strength that the present invention can be removed from the paper by pulling on such head comprising a portion of the head extending sufficiently from a prong closest to one end of the head to allow a digit of a hand to be inserted between that end of the head and the paper;

a portion of the head extending away from the prong opposite the aforementioned side, in sufficient length relative to the prongs so that when the first mentioned end is lifted up with a digit of a hand to where the head is in a non-parallel position relative to the paper, both prongs are extracted from the paper, said head having a size large enough to sufficiently produce adequate leverage for one to lift up one end of the head with a digit of a hand, unaided by a mechanical device, using the opposite end of the head as a fulcrum point, to extract the prongs.

2. A removable fastener comprising one or more prongs, that are adapted to be clinched, combined with a head means for removing the fastener, wherein the head is planar and extends in opposed lateral directions from the prong or prongs to opposed edges and has sufficient rigidity to allow one of said edges to be lifted by a finger or digit of a hand while the other said edge acts as a pivot, whereby the head acts as a lever to increase the extraction force applied to the prong or prongs, the end of the head opposite the end to be lifted up, having a bump on the underneath side, such bump serving to accentuate the leverage without having to increase the overall length of the head.

3. A removable fastener comprising one or more prongs, that are adapted to be clinched, combined with a head means for removing the fastener, wherein the head is planar and extends in opposed lateral directions from the prong or prongs to opposed edges and has sufficient rigidity to allow one of said edges to be lifted by a finger or digit of a hand while the other said edge acts as a pivot, whereby the head acts as a lever to increase the extraction force applied to the prong or prongs, a bump on the bottom of the head of the end to be used as a fulcrum point, such bump increasing the length of the bottom of the head relative to the length of the fastener prongs, allowing a shorter overall head length yet still providing for sufficient length to extricate the fastener prongs.

4. A removable fastener comprising one or more prongs, that are adapted to be clinched, combined with a head means for removing the fastener, wherein the head is planar and extends in opposed lateral directions from the prong or prongs to opposed edges and has sufficient rigidity to allow one of said edges to be lifted by a finger or digit of a hand while the other said edge acts as a pivot, whereby the head acts as a lever to increase the extraction force applied to the prong or prongs.

* * * * *